US012680690B1

(12) United States Patent
Zhang

(10) Patent No.: US 12,680,690 B1
(45) Date of Patent: Jul. 14, 2026

(54) LIGHT-EMITTING DRAWING BOARD

(71) Applicant: Li Zhang, Hunan (CN)

(72) Inventor: Li Zhang, Hunan (CN)

( * ) Notice: Subject to any disclaimer, the term of this patent is extended or adjusted under 35 U.S.C. 154(b) by 0 days.

(21) Appl. No.: 19/276,819

(22) Filed: Jul. 22, 2025

(51) Int. Cl.

| | |
|---|---|
| ***F21V 33/00*** | (2006.01) |
| ***B43L 5/00*** | (2006.01) |
| ***F21V 9/02*** | (2018.01) |
| ***F21V 15/01*** | (2006.01) |
| ***F21V 23/00*** | (2015.01) |
| ***F21V 23/02*** | (2006.01) |
| ***F21V 23/04*** | (2006.01) |
| ***F21V 23/06*** | (2006.01) |
| ***F21W 131/30*** | (2006.01) |

(52) U.S. Cl.
CPC ............ *F21V 33/0048* (2013.01); *B43L 5/00* (2013.01); *F21V 9/02* (2013.01); *F21V 15/01* (2013.01); *F21V 23/009* (2013.01); *F21V 23/023* (2013.01); *F21V 23/04* (2013.01); *F21V 23/06* (2013.01); *F21W 2131/30* (2013.01)

(58) Field of Classification Search
CPC ..... G02B 6/005; F21V 33/0048; F21V 15/01; F21V 23/02; F21V 23/06; F21V 9/02; F21V 23/00; F21V 23/04; G02F 1/133308; G02F 1/133314; G02F 1/133615; F21W 131/30
See application file for complete search history.

(56) References Cited

U.S. PATENT DOCUMENTS

| | | | | |
|---|---|---|---|---|
| 7,604,366 B1 * | 10/2009 | Chen | F21V 23/0414 | 362/225 |
| 2014/0301107 A1 * | 10/2014 | Mizutani | G02B 6/0091 | 362/612 |
| 2015/0124177 A1 * | 5/2015 | Ikuta | G02B 6/0088 | 348/790 |
| 2016/0195673 A1 * | 7/2016 | Yoon | G02B 6/005 | 362/606 |
| 2024/0280847 A1 * | 8/2024 | Kocovski | F16M 13/02 | |

* cited by examiner

*Primary Examiner* — William J Carter
(74) *Attorney, Agent, or Firm* — Hawaii Patent Services; Nathaniel K. Fedde; Kenton N. Fedde

(57) ABSTRACT

The present disclosure relates to a light-emitting drawing board, comprising: a drawing board body, a base, a light source assembly, and a limiting part; the bottom of the drawing board body is provided with a connecting part, which is provided with a mounting hole; the base comprises a front cover plate provided with a second connecting post and a rear cover plate provided with a first connecting post, the first connecting post has a central hole, and the outer diameter of the second connecting post is not greater than the diameter of the central hole.

20 Claims, 6 Drawing Sheets

LIGHT-EMITTING DRAWING BOARD

TECHNICAL FIELD

The present disclosure relates to the technical field of drawing boards, and particularly to a light-emitting drawing board.

BACKGROUND

In existing technologies, light-emitting drawing boards are widely used in fields such as teaching and design. However, current light-emitting drawing boards on the market have many shortcomings. On one hand, the detachable connection structure between their front cover plate and rear cover plate is often overly complex, making the installation process cumbersome, time-consuming, and labor-intensive. Moreover, loosening frequently occurs during use, affecting the stability and service life of the drawing board. On the other hand, the placement and fixation of light strips lack rational design, leading to irregular installation of light strips, which may result in issues such as shaking and poor contact, thereby hindering the normal use of the light-emitting drawing board.

For example, in the illuminated display panel with tilted light sources disclosed in U.S. Pat. No. 9,443,453B2, two frame members are fixed together using screws, adhesives, and interference fit. While this achieves a secure fixation, the installation steps are cumbersome and time-consuming, significantly increasing manufacturing costs and installation difficulty, as well as complicating subsequent maintenance.

SUMMARY

The present disclosure provides a light-emitting drawing board to address the issues raised in the background art.

A light-emitting drawing board comprises a drawing board body, a base, a light source assembly, and a limiting part. A bottom of the drawing board body is provided with a connecting part provided with mounting holes. The base comprises a front cover plate provided with a second connecting post and a rear cover plate provided with a first connecting post, wherein the first connecting post has a central hole, an outer diameter of the second connecting post is not greater than a diameter of the central hole, and the front cover plate and the rear cover plate are spliced by inserting the second connecting post into the central hole and form an accommodation space between the front cover plate and the rear cover plate. The limiting part is positioned on one of the front cover plate or the rear cover plate. The mounting holes are sleeved between the first connecting post and the second connecting post, and when the front cover plate and the rear cover plate are spliced together, the drawing board body and the base are fixedly connected; and the limiting part and the bottom of the drawing board body define a mounting cavity, the light source assembly is positioned in the mounting cavity, and the light source assembly abuts against the limiting part and the bottom of the drawing board body respectively to restrict the movement of the light source assembly.

A light-emitting drawing board comprises a drawing board body, a base, a light source assembly, and a limiting part. A bottom of the drawing board body is provided with a connecting part provided with mounting holes. The base comprises a front cover plate provided with a second connecting post and a rear cover plate provided with a first connecting post, wherein the first connecting post has a central hole, an outer diameter of the second connecting post is not greater than a diameter of the central hole, and the front cover plate and the rear cover plate are spliced by inserting the second connecting post into the central hole and form an accommodation space between the front cover plate and the rear cover plate. The limiting part is positioned on either the front cover plate or the rear cover plate, the front cover plate and the rear cover plate are respectively provided with a front bottom surface and a rear bottom surface, and the limiting part is arranged on the front bottom surface or the rear bottom surface and extends away from the bottom surfaces. A light-emitting direction of the light source assembly faces the drawing board body. The mounting holes are sleeved between the first connecting post and the second connecting post, and when the front cover plate and the rear cover plate are spliced, the drawing board body and the base are fixedly connected; and the limiting part and the bottom of the drawing board body define a mounting cavity, the light source assembly is positioned in the mounting cavity and abuts against the limiting part and the bottom of the drawing board body respectively to restrict the movement of the light source assembly.

A light-emitting drawing board comprises a drawing board body, a base, a light source assembly, and a limiting part. A bottom of the drawing board body is provided with a first connecting part and a second connecting part, and both the first connecting part and the second connecting part are provided with mounting holes. The base comprises a front cover plate provided with a second connecting post and a rear cover plate provided with a first connecting post, the first connecting post has a central hole, an outer diameter of the second connecting post is not greater than a diameter of the central hole, and the front cover plate and the rear cover plate are spliced by inserting the second connecting post into the central hole and form an accommodation space between the front cover plate and the rear cover plate; and wherein the drawing board further comprises a fourth connecting post and a fifth connecting post provided on the front cover plate, and a third connecting post and a first limiting ring provided on the rear cover plate; and the fourth connecting post is inserted into the third connecting post, and the fifth connecting post is inserted into the first limiting ring. The limiting part is positioned either the front cover plate or the rear cover plate, the front cover plate and the rear cover plate are respectively provided with a front bottom surface and a rear bottom surface, the limiting part is provided on the front bottom surface or the rear bottom surface, and the limiting part extends away from the bottom surface. A light-emitting direction of the light source assembly faces the drawing board body. The mounting holes are sleeved between the first connecting post and the second connecting post, and when the front cover plate and the rear cover plate are spliced together, the drawing board body and the base are fixedly connected, and the limiting part and the bottom of the drawing board body define a mounting cavity, the light source assembly is positioned in the mounting cavity, and the light source assembly abuts against the limiting part and the bottom of the drawing board body to restrict the movement of the light source assembly.

To achieve the above object, the present disclosure adopts the following technical solutions:

By setting specific detachable components, the simple and stable installation of the front cover plate and rear cover plate is achieved, addressing the issues of cumbersome installation and easy loosening in existing technologies. By placing the light source assembly in the mounting cavity formed between the limiting part and the drawing board body, the light source assembly, once inserted, abuts against the limiting part and the drawing board body, ensuring the stability of the light source assembly and providing a stable light source for the drawing board body.

BRIEF DESCRIPTION OF DRAWINGS

The drawings, which form part of this application, are included to provide a further understanding of the present disclosure. The illustrative embodiments of the present disclosure and the descriptions thereof are intended to explain the present disclosure and do not constitute any undue limitation thereof. In the drawings:

FIG. 6 is a structural schematic view of the front cover plate and rear cover plate in

FIG. 1;

Figure 1:
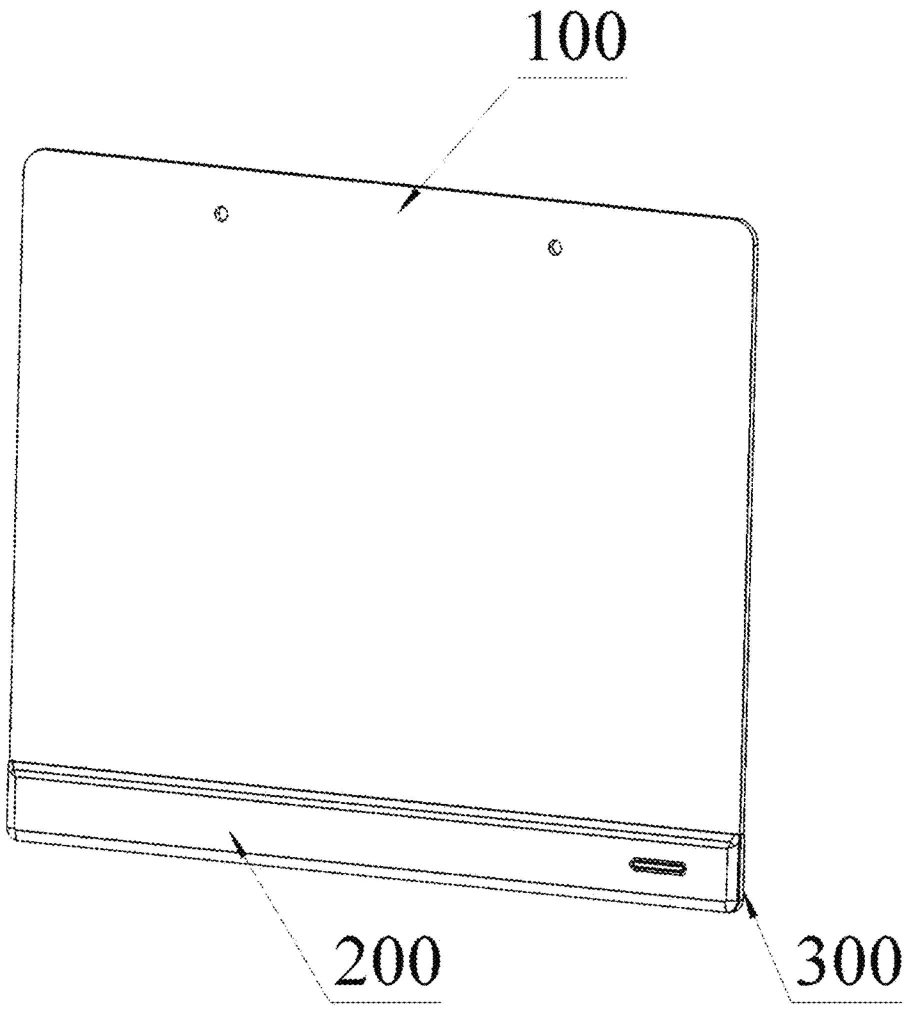
FIG. 1 is a perspective schematic view of an embodiment provided by the present disclosure.

Reference signs: Drawing board body (100); First connecting part (101); Second connecting part (102); Mounting hole (103); Front cover plate (200); Second connecting post (201); Second placement groove (202); Fourth connecting post (203); Fifth connecting post (204); Top post (205); Switch hole (206); Second through hole (207); Rear cover plate (300); First connecting post (301); Limiting block (302); First limiting ring (303); Third connecting post (304); First placement groove (305); Limiting part (306); First through hole (307); Light source assembly (400); Power supply assembly (500); Control board (600); Switch assembly (601); Charging port (602).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms “comprising” and/or “including” are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

As shown in FIG. 1, a light-emitting drawing board includes a drawing board body 100. The drawing board body 100 is equipped with a base, which consists of a front cover plate 200 and a rear cover plate 300. A detachable component is arranged between the front cover plate 200 and the rear cover plate 300, allowing them to be mounted to the drawing board body 100 through this component, ensuring a stable connection among the front cover plate 200, rear cover plate 300, and drawing board body 100.

Figure 2:
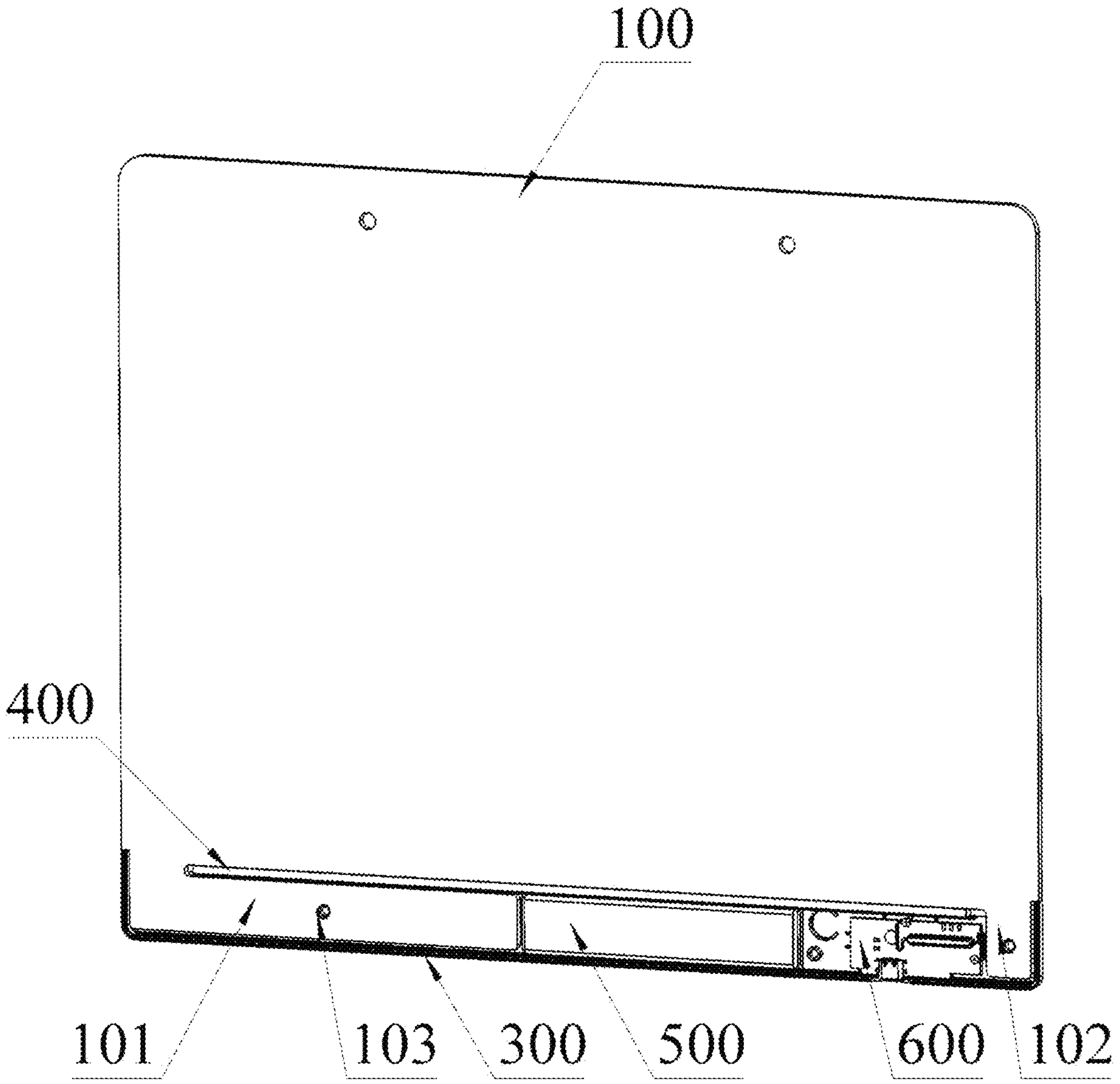
FIG. 2 is a structural schematic view of the light source assembly, power supply assembly, and control board in FIG. 1.
Figure 3:
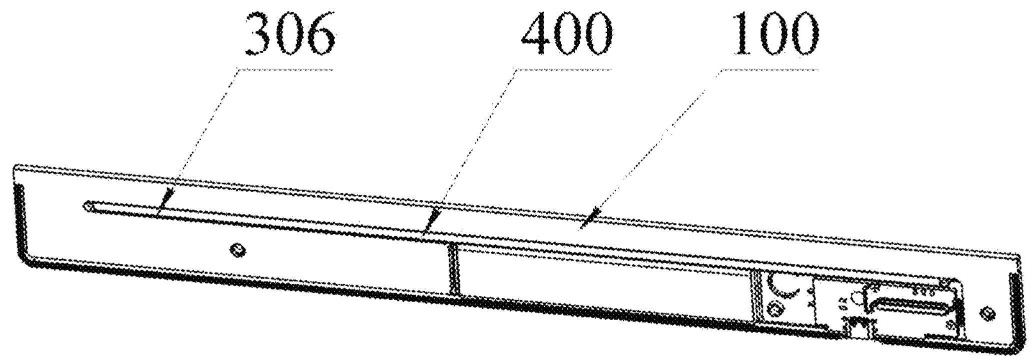
FIG. 3 is a structural schematic view of the drawing board body, light source assembly, and limiting part in FIG. 2.

As shown in FIG. 2, the bottom of the drawing board body 100 features a connecting part, which includes a first connecting part 101 and a second connecting part 102. Both the first connecting part 101 and the second connecting part 102 are provided with mounting holes 103. The front cover plate 200 and rear cover plate 300 are assembled with the mounting holes 103 through the detachable component to achieve the installation of the drawing board body 100 onto the base.

Figure 4:
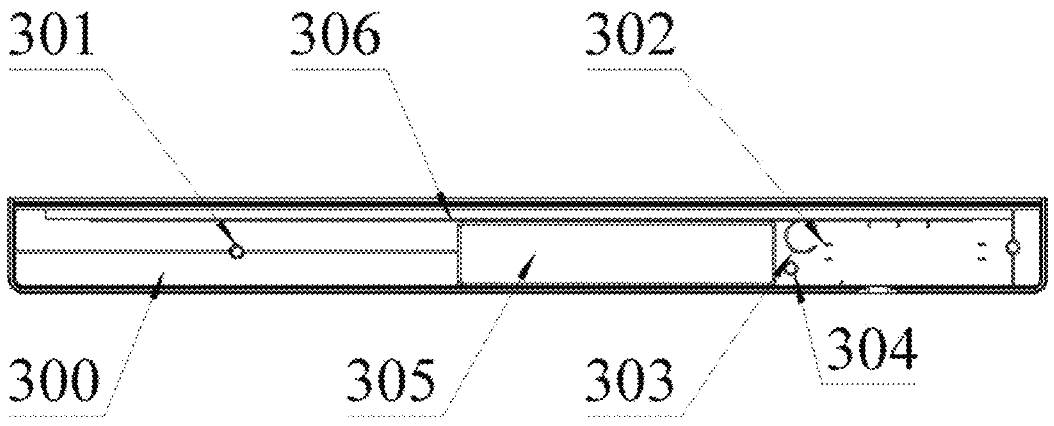
FIG. 4 is a structural schematic view of the interior of the rear cover plate in FIG. 2.
Figure 5:
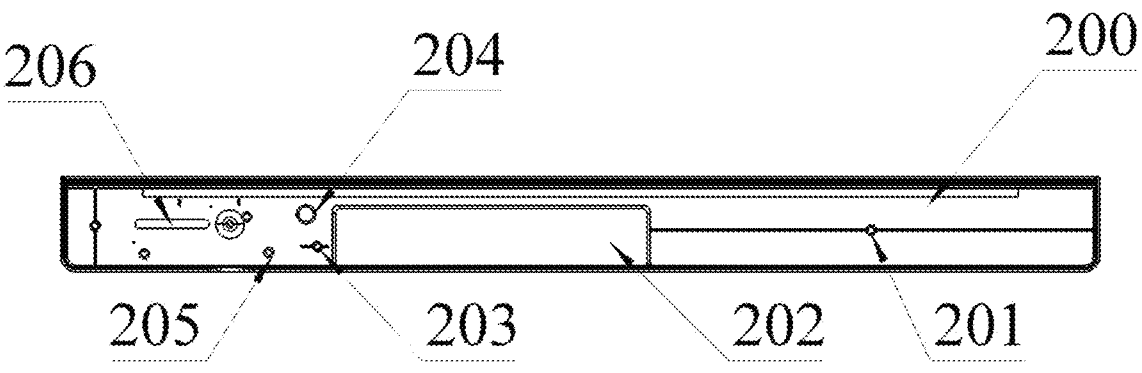
FIG. 5 is a structural schematic view of the interior of the front cover plate in FIG. 2.

As shown in FIGS. 4 to 5, the detachable component includes a second connecting post 201, a fourth connecting post 203, and a fifth connecting post 204 mounted on the front cover plate 200, as well as a first connecting post 301, a first limiting ring 303, and a third connecting post 304 mounted on the rear cover plate 300. The first connecting post 301 has a central hole, and the outer diameter of the second connecting post 201 does not exceed the diameter of the central hole. The first connecting post 301 is inserted into the mounting hole 103, while the front cover plate 200 and rear cover plate 300 are spliced by inserting the second connecting post 201 into the central hole, forming an accommodation space between the the front cover plate 200 and rear cover plate 300. The fourth connecting post 203 is inserted into the third connecting post 304, and the fifth connecting post 204 is inserted into the first limiting ring 303, enabling the detachable installation of the front cover plate 200 and rear cover plate 300. This design simplifies the assembly process and ensures the front cover plate 200 and rear cover plate 300 remain secure after installation.

Here, the first connecting post 301 and the mounting hole 103 are in a transition fit, ensuring the first connecting post 301 can be stably inserted into the mounting hole 103. This creates a fixed connection between the drawing board body 100 and the base, preventing easy loosening. By incorporating this specific detachable component, the front cover plate 200 and rear cover plate 300 achieve simple and stable installation.

In other embodiments (not shown), the first connecting post 301, the second connecting post 201, and the mounting hole 103 can all be circular structures, or they can all be polygonal structures such as triangular or square, ensuring a tight connection between the first connecting post 301 and the third connecting post 304. The front cover plate 200 and the rear cover plate 300 are fixed to the drawing board body 100 through the mounting hole 103.

In other embodiments (not shown), the front cover plate 200 has an annular magnet embedded along its edge, while the rear cover plate 300 features an iron adsorption ring (or a magnet ring with reverse polarity) at the corresponding position. The mounting hole 103 on the drawing board body 100 is replaced with positioning protrusions, and the inner sides of the front cover plate 200 and the rear cover plate 300 are equipped with matching positioning grooves. Magnetic attraction enables quick assembly and disassembly of the cover plates, while the positioning protrusions prevent misalignment. No detachable components are needed, reducing the number of parts, making it suitable for frequent disassembly scenarios (e.g., children's drawing boards).

In other embodiments (not shown), the rear cover plate 300 is equipped with L-shaped elastic clips on both sides, with barbs at the ends. The inner side of the front cover plate 200 has clip slots, and the side of the drawing board body 100 is provided with through clip holes. The clips of the rear cover plate 300 pass through the clip holes of the drawing board, and the clip slots of the front cover plate 200 slide horizontally into the clips, with the barbs automatically locking. Installation is completed with a single sliding motion, and pressing the clip release button allows disassembly. This structure is more resistant to lateral vibrations than connecting mechanisms, making it suitable for vehicle-mounted drawing boards.

As shown in FIGS. 2 to 5, a light source assembly 400, a power supply assembly 500, and a control board 600 are arranged between the front cover plate 200 and the rear cover plate 300. The front cover plate 200 is provided with a second placement groove 202 and a plurality of top posts 205, as well as a switch hole 206 and a second through hole 207. The rear cover plate 300 is equipped with a first placement groove 305 and a plurality of limiting blocks 302. The rear cover plate 300 extends toward the drawing board body 100 to form a limiting part 306, i.e., the rear cover plate 300 extends toward the first connecting post 301 to form the limiting part 306. The rear cover plate 300 also has a first through hole 307 corresponding to the second through hole 207.

Here, a mounting cavity is formed between the limiting part 306 and the drawing board body 100, where the light source assembly 400 is positioned. When the light source assembly 400 is placed in the mounting cavity, both ends of the light source assembly 400 abut against the limiting part 306 and the bottom of the drawing board body 100, respectively, restricting the movement of the light source assembly 400 and ensuring its stability after installation. The light-emitting direction of the light source assembly 400 faces the drawing board body 100, providing a stable light source for the drawing board body 100 through the light source assembly 400. The second placement groove 202 and the first placement groove 305 are fitted to form a groove body for placing the power supply assembly 500, which supplies power to the light source assembly 400, ensuring it can illuminate the drawing board body 100.

Figure 6:
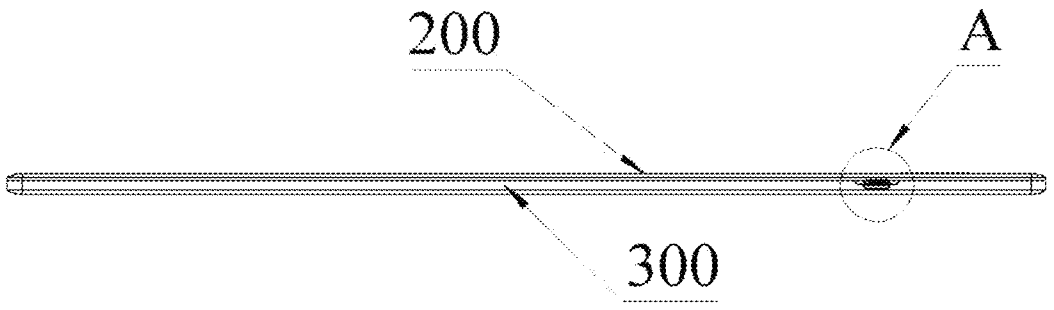
Figure 7:
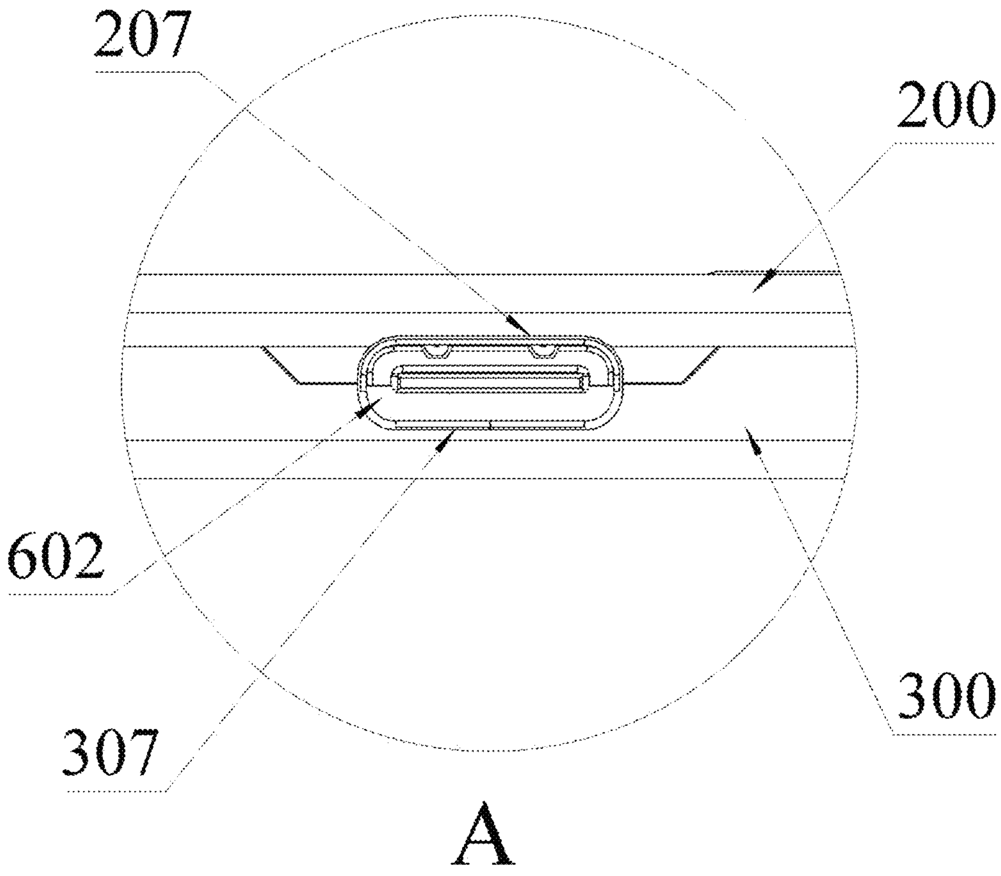
FIG. 7 is an enlarged structural view of section A in FIG. 6.
Figure 8:
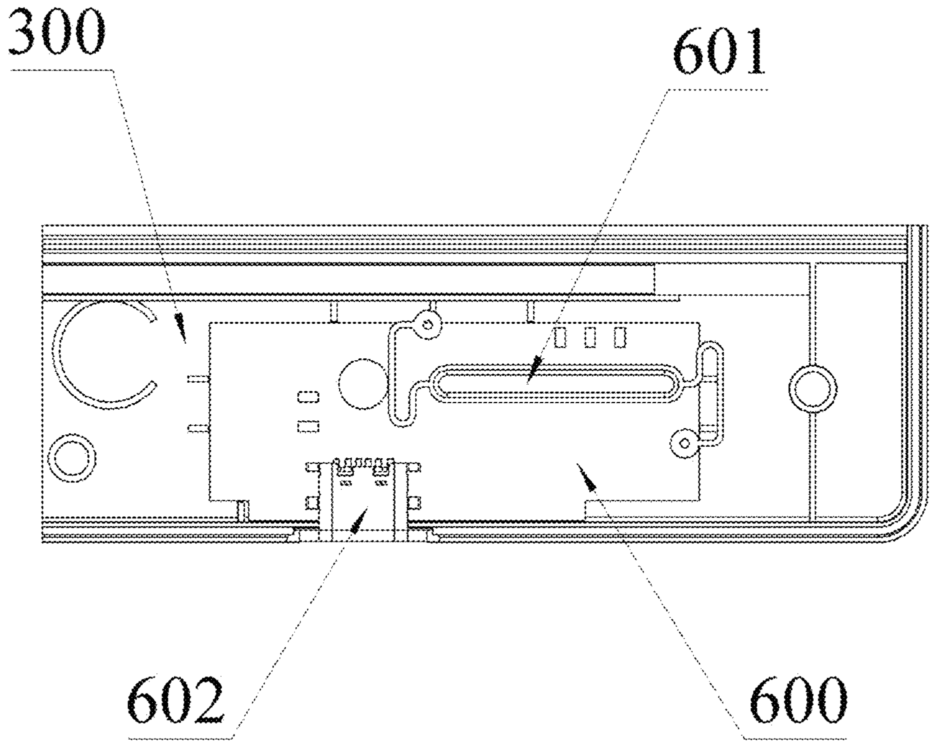
FIG. 8 is a structural schematic view of the rear cover plate and control board in FIG. 2.

As shown in FIGS. 6 to 8, a control board 600 is secured to the rear cover plate 300 by the limiting block 302, limiting the position of the control board 600. When the front cover plate 200 and rear cover plate 300 are installed, the top post 205 on the front cover plate 200 abuts against the control board 600, further limiting the position of the control board 600. The control board 600 is equipped with a charging port 602, whose input end is positioned between the first through hole 307 and the second through hole 207, facilitating connection between the charging port 602 to an external power source for charging the power supply assembly 500. The control board 600 also includes a switch assembly 601 located inside the switch hole 206, allowing easy operation to control the light source assembly 400 by pressing the switch assembly 601.

In other embodiments (not shown), the limiting part 306 may be cylindrical, wavy, serrated, or other shapes. The light source assembly 400 is positioned inside the mounting cavity, with both ends abutting against the limiting part 306 and the drawing board body 100, ensuring the light source assembly 400 remains immobile.

In other embodiments (not shown), the limiting part 306 is replaced with a detachable U-shaped lamp slot, with conductive spring contacts at the base. The light source assembly 400 has integrated metal contacts at both ends, automatically completing the circuit upon insertion into the lamp slot. The lamp slot is connected to the rear cover plate 300 through sliding rails and locking is realized upon a side push.

In other embodiments (not shown), threaded posts are installed at all four corners of the drawing board body 100. The front cover plate 200 and rear cover plate 300 are provided with arc-shaped slots with countersunk ends at corresponding positions. A rotating lock ring with internal threads is added to match the posts. The arc-shaped slots of the cover plates are aligned with the posts, and the lock ring slides along the arc arc-shaped slot to the countersunk position, where it is tightened. This provides far greater clamping force than the transition fit of connecting posts, enhancing impact resistance. The countersunk design prevents the lock ring from dislodging, making it suitable for outdoor sketching boards.

In other embodiments (not shown), the charging port 602, first through hole 307, and second through hole 207 are removed. A wireless receiver coil is added in the power supply assembly 500, and a wireless transmitter module is mounted inside the rear cover plate 300. The switch assembly 601 is replaced with a Hall sensor, while a magnet is embedded on the front cover plate 200 at a corresponding position. The switch is triggered by proximity to the magnet, eliminating dust ingress through holes entirely. Wireless charging improves the overall waterproof rating (IP67), making it ideal for humid environments.

In other embodiments (not shown), the limiting part 306 is replaced with a spring support post topped with a silicone pressure head. The rear cover plate 300 includes a guide hole, allowing the spring post to retract and extend. After inserting the light source assembly 400, the spring automatically presses light strips with varying thicknesses, eliminating the wobble issue caused by the tolerances of the light strips in the original solution and ensuring compatibility with third-party light strips.

In summary, the present disclosure achieves the following technical effects:

By arranging detachable components, the front cover plate 200 and rear cover plate 300 can be installed simply and stably, solving the issues of cumbersome installation and easy loosening in prior art; by placing the light source assembly 400 in the mounting cavity formed between the limiting part 306 and the drawing board body 100, the light source assembly 400 abuts against the limiting part 306 and the drawing board body 100 after insertion, ensuring the stability of the light source assembly 400 and providing a stable light source for the drawing board body 100 by the light source assembly 400.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A light-emitting drawing board, comprising:

a drawing board body, a base, a light source assembly, and a limiting part, wherein:

a bottom of the drawing board body is provided with a connecting part provided with mounting holes; and the base comprises a front cover plate provided with a second connecting post and a rear cover plate provided with a first connecting post, wherein the first connecting post has a central hole, an outer diameter of the second connecting post is not greater than a diameter of the central hole, and the front cover plate and the rear cover plate are spliced by inserting the second connecting post into the central hole and form an accommodation space between the front cover plate and the rear cover plate; and the limiting part is positioned on one of the front cover plate or the rear cover plate;

wherein the mounting holes are sleeved between the first connecting post and the second connecting post, and when the front cover plate and the rear cover plate are spliced together, the drawing board body and the base are fixedly connected; and the limiting part and the bottom of the drawing board body define a mounting cavity, the light source assembly is positioned in the mounting cavity, and the light source assembly abuts against the limiting part and the bottom of the drawing board body respectively to restrict the movement of the light source assembly.

2. The light-emitting drawing board according to claim 1, wherein the connecting part comprises a first connecting part and a second connecting part arranged at intervals, and the mounting holes are respectively provided on the first connecting part and the second connecting part.

3. The light-emitting drawing board according to claim 1, wherein there are two mounting holes respectively sleeved on the first connecting post and the second connecting post.

4. The light-emitting drawing board according to claim 1, further comprising a fourth connecting post and a fifth connecting post provided on the front cover plate, and a third connecting post and a first limiting ring provided on the rear cover plate, wherein the fourth connecting post is inserted into the third connecting post, and the fifth connecting post is inserted into the first limiting ring.

5. The light-emitting drawing board according to claim 1, wherein the limiting part extends from the rear cover plate toward the first connecting post.

6. The light-emitting drawing board according to claim 1, wherein both ends of the light source assembly respectively abut against an end surface of the limiting part and a bottom planar surface of the drawing board body.

7. The light-emitting drawing board according to claim 1, further comprising a power supply assembly, the front cover plate is provided with a second placement groove, the rear cover plate is provided with a first placement groove, and the second placement groove and the first placement groove are spliced to form a closed groove body for accommodating the power supply assembly.

8. The light-emitting drawing board according to claim 1, further comprising a control board, the rear cover plate is provided with a plurality of limiting blocks, and the front cover plate is provided with a plurality of top posts; and the control board is positioned by being clamped by the limiting blocks, and the top posts abut against the control board when the cover plates are spliced.

9. The light-emitting drawing board according to claim 8, wherein the rear cover plate is provided with a first through hole, and the front cover plate is provided with a second through hole; and a charging port of the control board is located in a passage formed by the first through hole and the second through hole.

10. The light-emitting drawing board according to claim 1, wherein the first connecting post and the mounting hole are in a transition fit.

11. The light-emitting drawing board according to claim 1, wherein cross-sections of the first connecting post, the second connecting post, and the mounting hole are triangular, square, or other polygonal structures.

12. A light-emitting drawing board, comprising:

a drawing board body, a base, a light source assembly, and a limiting part, wherein:

a bottom of the drawing board body is provided with a connecting part provided with mounting holes; and the base comprises a front cover plate provided with a second connecting post and a rear cover plate provided with a first connecting post, wherein the first connecting post has a central hole, an outer diameter of the second connecting post is not greater than a diameter of the central hole, and the front cover plate and the rear cover plate are spliced by inserting the second connecting post into the central hole and form an accommodation space between the front cover plate and the rear cover plate; and the limiting part is positioned on either the front cover plate or the rear cover plate, the front cover plate and the rear cover plate are respectively provided with a front bottom surface and a rear bottom surface, and the limiting part is arranged on the front bottom surface or the rear bottom surface and extends away from the bottom surfaces; and a light-emitting direction of the light source assembly faces the drawing board body; and wherein the mounting holes are sleeved between the first connecting post and the second connecting post, and when the front cover plate and the rear cover plate are spliced, the drawing board body and the base are fixedly connected; and the limiting part and the bottom of the drawing board body define a mounting cavity, the light source assembly is positioned in the mounting cavity and abuts against the limiting part and the bottom of the drawing board body respectively to restrict the movement of the light source assembly.

13. The light-emitting drawing board according to claim 12, wherein the connecting part comprises a first connecting part and a second connecting part, the mounting holes are respectively provided on the first connecting part and the second connecting part, and the first connecting post and the second connecting post are respectively fitted with the corresponding mounting holes.

14. The light-emitting drawing board according to claim 12, wherein the first connecting post and the mounting holes are in a transition fit to enhance the connection stability between the drawing board body and the base.

15. The light-emitting drawing board according to claim 12, wherein the front cover plate is further provided with a fourth connecting post, the rear cover plate is provided with a third connecting post, and the fourth connecting post is inserted into the third connecting post to assist in t splicing of the front cover plate and the rear cover plate.

16. The light-emitting drawing board according to claim 12, wherein the front cover plate is further provided with a fifth connecting post, the rear cover plate is provided with a first limiting ring, and the fifth connecting post is inserted into the first limiting ring to further assist in splicing of the front cover plate and the rear cover plate.

17. The light-emitting drawing board according to claim 12, further comprising a power supply assembly, the front cover plate is provided with a second placement groove, the rear cover plate is provided with a first placement groove, and the second placement groove and the first placement groove are fitted to form a groove body for accommodating the power supply assembly.

18. The light-emitting drawing board according to claim 12, further comprising a control board, the rear cover plate is provided with a plurality of limiting blocks, the control board is clamped onto the rear cover plate by the limiting blocks; and the front cover plate is provided with a plurality of top posts, and when the front cover plate and the rear cover plate are spliced, the top posts abut against the control board to further restrict the movement of the control board.

19. The light-emitting drawing board according to claim 12, wherein the control board is provided with a charging port, the front cover plate and the rear cover plate are respectively provided with corresponding first and second through holes, and an input end of the charging port is located between the first and second through holes; and the control board is provided with a switch assembly, the front cover plate is provided with a switch hole, and the switch assembly is located inside the switch hole.

20. A light-emitting drawing board, comprising:

a drawing board body, a base, a light source assembly, and a limiting part, wherein a bottom of the drawing board body is provided with a first connecting part and a second connecting part, and both the first connecting part and the second connecting part are provided with mounting holes; and the base comprises a front cover plate provided with a second connecting post and a rear cover plate provided with a first connecting post, the first connecting post has a central hole, an outer diameter of the second connecting post is not greater than a diameter of the central hole, and the front cover plate and the rear cover plate are spliced by inserting the second connecting post into the central hole and form an accommodation space between the front cover plate and the rear cover plate; and wherein the drawing board further comprises a fourth connecting post and a fifth connecting post provided on the front cover plate, and a third connecting post and a first limiting ring provided on the rear cover plate; and the fourth connecting post is inserted into the third connecting post, and the fifth connecting post is inserted into the first limiting ring; and the limiting part is positioned either the front cover plate or the rear cover plate, the front cover plate and the rear cover plate are respectively provided with a front bottom surface and a rear bottom surface, the limiting part is provided on the front bottom surface or the rear bottom surface, and the limiting part extends away from the bottom surface; and a light-emitting direction of the light source assembly faces the drawing board body; and wherein the mounting holes are sleeved between the first connecting post and the second connecting post, and when the front cover plate and the rear cover plate are spliced together, the drawing board body and the base are fixedly connected, and the limiting part and the bottom of the drawing board body define a mounting cavity, the light source assembly is positioned in the mounting cavity, and the light source assembly abuts against the limiting part and the bottom of the drawing board body to restrict the movement of the light source assembly.

* * * * *